March 11, 1969     E. J. JOHNSTON     3,431,710

HAY CONDITIONER ROLL ARRANGEMENT

Filed Jan. 25, 1966

Inventor:
Edward J. Johnston

United States Patent Office 3,431,710
Patented Mar. 11, 1969

3,431,710
HAY CONDITIONER ROLL ARRANGEMENT
Edward J. Johnston, La Grange, Ill., assignor to International Harvester Company, Chicago, Ill., a corporation of Delaware
Filed Jan. 25, 1966, Ser. No. 522,892
U.S. Cl. 56—1                                   1 Claim
Int. Cl. A01d

ABSTRACT OF THE DISCLOSURE

A hay conditioner having a roller with helical ribs, rings interconnecting the ends of the ribs and connected to a cylindrical roller body inwardly of the ends thereof, a support plate at each end of the roller with an annular flange surrounding the adjacent end of the body in a close fitting sliding fit, a shaft stub projecting from each end of the roller having a mounting at one end within the roller body, an annulus on each plate projecting into the adjacent end of the roller, and a bearing mounted in the annulus journaling the adjacent stub shaft, the annulus and annular flange being in radial alignment.

---

The present invention relates to a hay conditioner roll arrangement.

The invention has particular adaptability to a hay conditioner of the type having a pair of rolls operative for crushing hay stalks introduced therebetween. One of the rolls is rigid and non-yielding, as of metal, and provided with helical splines.

A disadvantage of this general type of hay conditioner heretofore known is that, due to the construction of the splined roll, the hay plants were forced axially along the roll and tended to bunch up and jam at the end of the roll, and were forced off the end thereof and into the bearings supporting the roll.

A broad object of the present invention is to provide a novel construction which eliminates the foregoing disadvantage.

A more specific object is to provide a novel construction closing the spaces between the splines at the end of the roll, which prevents the hay stalks from bunching up and jamming and being forced off of the end of the roll as stated.

Another object is to provide a construction including a roll of the general character referred to above in conjunction with a mounting that includes a bearing means, the construction including a novel arrangement precluding jamming of the hay stalks in the bearing means and wrapping around the shaft of the roll.

Other objects and advantages of the invention will appear from the following detail description taken in conjunction with the accompanying drawings wherein—

Figure 1:
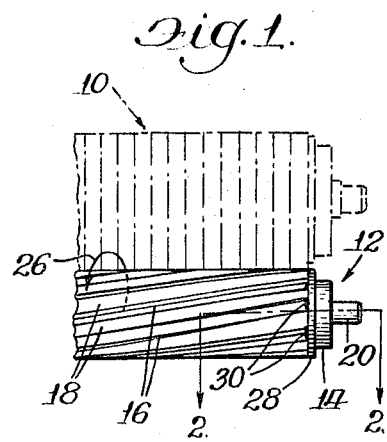
Figure 2:
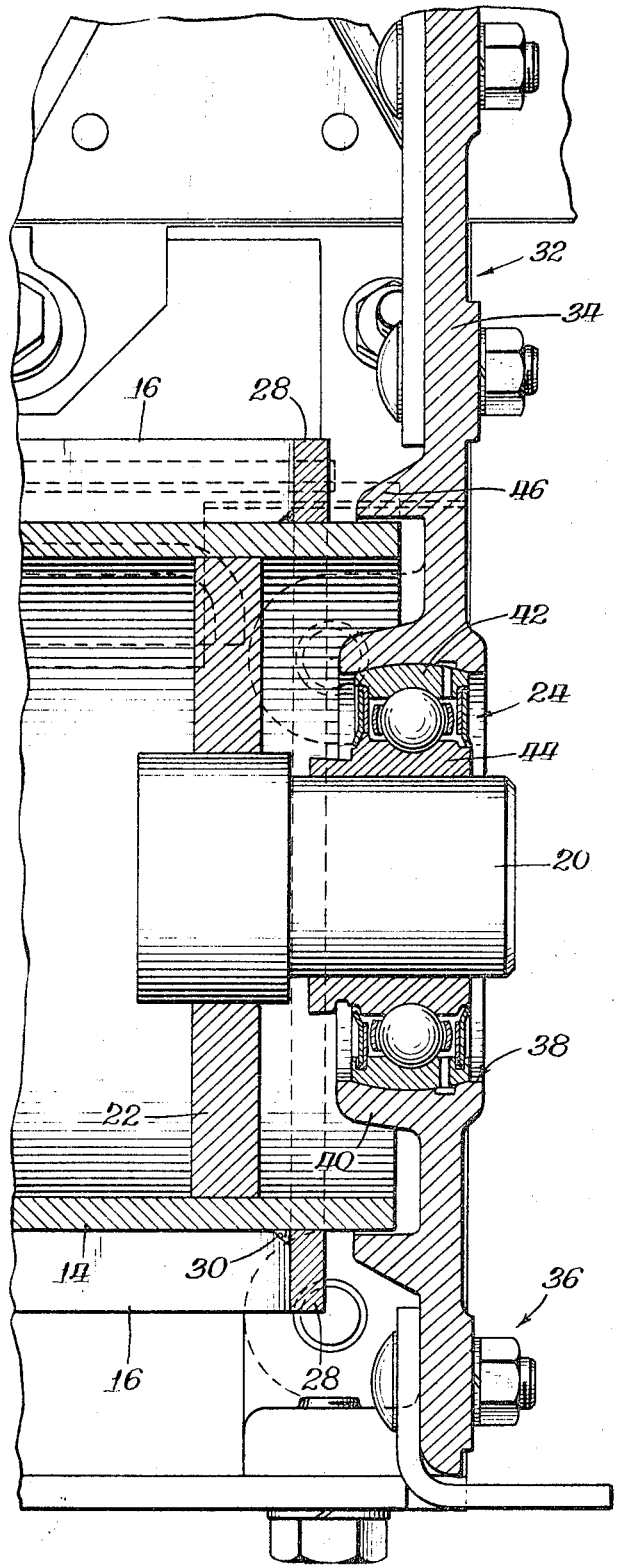

FIGURE 1 is an elevational view of the pair of rolls utilized in a hay conditioner, the one to which the present invention is applied being shown in full lines; and FIGURE 2 is a large scale sectional view taken at line 2—2 of FIGURE 1 and also showing the means for mounting the roll.

The rolls 10 and 12 shown in FIGURE 1 are utilized as pressure rolls for crushing plants such as hay stalks introduced therebetween. These rolls may be incorporated in any of various implements, such for example as a mower, etc. The upper roll 10 may be of any desired type such for example as of rubber or other yielding material while the roll 12 is rigid and non-yielding, being made of metal.

The lower roll 12 includes a body 14 in the form of a cylindrical tube and a plurality of helical splines 16 secured thereto, providing grooves 18 between the splines, the splines being effective in conjunction with the roll 10 for performing the crushing action. The roll is provided with a support shaft 20 forming a trunion by which the end of the roll is mounted, this shaft being secured in the roll in any suitable manner such as by means of a disc or plate 22 secured in the body preferably spaced inwardly from the end of the body. The shaft is trunioned in suitable bearing means 24 which will be referred to again hereinbelow.

FIGURE 1 shows the rolls 10 and 12 from the rear side, i.e., the side from which the hay issues upon being conditioned, the lower roll thus rotating counterclockwise when viewed from the right of FIGURE 1 as indicated by the arrow 26. The helical positioning of the splines produces a camming effect on the hay stalks being conditioned, and forces them toward the end of the roll, in a direction according to the direction of extension of the splines, in the present instance to the right. This direction of forcing the stalks may be only in one direction, as when the splines 16 continue in the same direction throughout the length of the roll, but the construction may include splines inclined in the opposite direction and in that case the hay stalks would be forced to the opposite end of the roll, and the invention is sufficiently broad to encompass a roll in which the splines extend in opposite directions at opposite ends of the roll and in that case the stalks would be forced toward both ends of the roll, and hence the construction to be described specifically hereinbelow may be, and generally is, utilized at both ends.

In previously known hay conditioners, the camming action referred to forced the hay stalks beyond the end of the roll and into the area of the support shaft and bearing means. As a consequence, they wrapped around the shaft and found their way into the bearing means with obvious disadvantages; also they bunched up against the mounting means for the roll and worked back into the aggregate of stalks around the roll, causing the stalks to bunch up on the periphery of the roll causing great inefficiency in the crushing action. The splines additionally caused a wedging action, the stalks skidding and shifting about in the mass of stalks around the roll, the result being a "sluffing off," "scuffing" of the stalks and other similar actions militating against effective friction gripping of the rolls on the hay stalks and forcing them between the rolls.

The construction described hereinbelow overcomes the disadvantages referred to above. The construction includes a ring or annular plate-like member 28 surrounding the tubular body 14 and engaging the ends of the splines 16. The ring is welded to the splines and to the tubular body 14, as indicated at 30, the ring preferably snugly engaging the tubular body and being of such dimensions that its outer diameter is at least as great as the outer diameter of the splines, and is preferably substantially flush therewith. The splines terminate short of the end of the tubular body, the ring 28 thereby being positioned inwardly from the end of the body.

The means for mounting the end of the roll, indicated generally at 32 includes an end plate 34 mounted in the frame of the machine as indicated generally at 36. The end plate has a central opening 38 defined by a peripheral flange 40 and supporting the bearing means 24 which in turn supports the shaft 20 of the roll. The bearing means 24 may be of conventional character having an outer race 42 engaging the flange or annulus 40 and an inner race 44 engaging the shaft 20.

The end plate 34 is also provided with an inwardly directed annular flange 46 receiving the end of the tubular body 14 in a relatively snug but sliding fit. The flange 46 provides an encasement for the exposed end of the body of the roll and the inner side of the bearing means, preventing the entry of hay stalks, as well as other material, into the area of the bearings and preventing them from being jammed in the bearings and from being wrapped around the shaft 20. The ring 28 is disposed close to the end plate, minimizing any tendency of the stalks to pass therebetween.

The ring 28 prevents the hay stalks from being forced axially out of the spaces between the splines, by providing an enclosure for those spaces, and tends to prevent their being forced over the radially outer edge of the ring, providing a back stop for stalks. Thus not only are the stalks prevented from entering into the space within the roll body, but the ring tends to prevent them from being forced against the end plate 34 and bunching up or being compacted there. The stalks therefore are maintained in a condition closer to uniform thickness throughout the rolls with greater effectiveness and efficiency in the crushing action on the stalks.

While I have disclosed herein a preferred form of the invention it will be understood that changes may be made therein.

I claim:

1. In a hay conditioner of the type having a pair of cooperating rolls wherein one of the rolls has a rigid body and a plurality of peripheral helical ribs, and a journal shaft means extending outwardly of the ends of the body, the combination comprising a plate-like member mounted to the roll closing the axial ends of the spaces between the ribs, said ribs terminating axially short of the end of the body, said plate-like element being in the form of a ring engaging the ends of the splines and welded thereto and to the body and itself being disposed axially inwardly of the end of the body, said plate-like member closely engaging the body and having an outer diameter at least as great as the radially outer surface of the ribs, said shaft means extending into the body, a support element disposed inwardly from the end of the shaft means and supported within the body, the hay conditioner including a mounting means including an end plate lying substantially in a plane transverse to the axis of the roll, the plate provided with a central opening and a circumscribing annulus, bearing means positioned in the opening within the annulus and supporting the shaft means, said end plate also including an annular flange extending axially inwardly beyond the end of the body and enclosing an end portion thereof in a relatively snug but sliding fit, the flange providing a shield against the entry of material into the space between the end plate and the interior of the roll, said bearing extending axially into the adjacent end of the roll body, and said annular flange and annulus receiving the end of said roll body therebetween and being in radial alignment.

References Cited

UNITED STATES PATENTS

| 3,104,509 | 9/1963 | Clendenin et al. | 56—1 |
| 3,115,737 | 12/1963 | Harrer et al. | 56—1 |
| 3,241,300 | 3/1966 | Fell et al. | 56—1 X |

HUGH R. CHAMBLEE, *Primary Examiner.*